(No Model.)

E. J. SWEENEY.
NUT LOCK.

No. 594,918. Patented Dec. 7, 1897.

Witnesses:
Bertha Jenkins
Nellie Bunker

Inventor:
Eugene J. Sweeney
Per Morrison & Miller
Att'ys.

THE NORRIS PETERS CO., PHOTO-LITHO., WASHINGTON, D. C.

UNITED STATES PATENT OFFICE.

EUGENE J. SWEENEY, OF ROCKFORD, ILLINOIS.

NUT-LOCK.

SPECIFICATION forming part of Letters Patent No. 594,918, dated December 7, 1897.

Application filed May 19, 1897. Serial No. 637,299. (No model.)

*To all whom it may concern:*

Be it known that I, EUGENE J. SWEENEY, a citizen of the United States, residing at Rockford, in the county of Winnebago and State of Illinois, have invented certain new and useful Improvements in Nut-Locks, of which the following is a specification.

The object of this invention is to produce a positive nut-lock of few parts easily operated.

Figure 1:
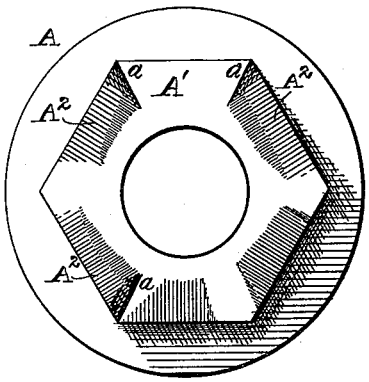
Figure 2:
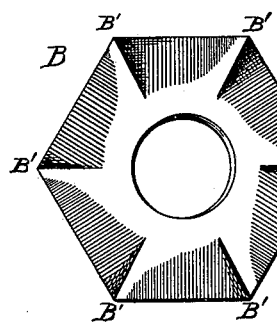
Figure 3:
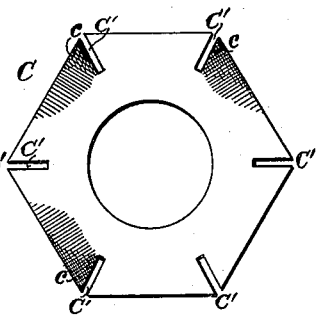
Figure 4:
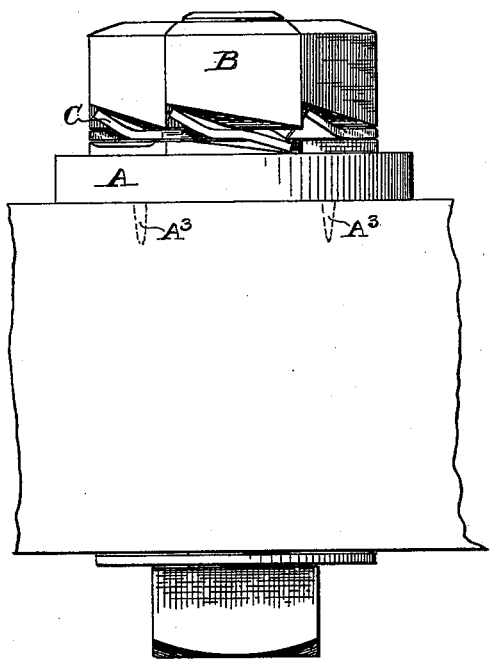

In the accompanying drawings, Figure 1 is an upper face view of the washer of this nut-lock. Fig. 2 is the lower face view of the nut. Fig. 3 is a plan view of the locking-plate of this nut-lock. Fig. 4 is an elevation of the nut-lock.

Like letters of reference indicate corresponding parts throughout the several views.

This nut-lock is applicable to any bolt of common form.

A is the washer, one of the three parts peculiar to the nut-lock, having the raised central portion A' of hexagonal outline, all the sides of which, except one side, are chamfered, as at $A^2$, forming teeth $a\ a\ a$ in the face of the raised central portion A'.

$A^3$ are projections for retaining the washer from turning.

B is the nut of the nut-lock, in this instance of hexagonal form, chamfered on its lower face to form the steps or teeth B', extending inwardly from the angles of the nut.

C is the locking-plate, formed from sheet metal and having the slits C' cut inwardly from the angles thereof, the figure of the plate corresponding with that of the nut, and the points $c\ c\ c$ are bent downward to engage the teeth $a\ a\ a$ in the face of the raised central portion A' of the washer A.

In application the washer A is first placed in position upon the bolt, the locking-plate C is placed upon the washer in such position that the points $c\ c\ c$ engage the teeth $a\ a\ a$, and the nut B turned upon the threads of the bolt until the projections $A^3$ of the washer A have been firmly embedded in the wood below the washer and the nut securely seated in position with its sides parallel with the sides of the raised middle portion A' of the washer A. The edges of the locking-plate, or one or more of those edges, are then bent so that they engage the teeth B', formed in the lower face of the nut B, and thus lock the nut relative to the washer A and prevent the accidental displacement of the former.

To unlock the nut, the locking-plate C is straightened to free its points from the teeth B', when the nut B may be freely turned. The locking-plate is bent by means of a cold chisel and hammer, the former being inserted in the chamfers $A^2$.

I claim as my invention—

In a nut-lock, in combination, a bolt having a single, one-way thread, a washer fixed with relation to the part surrounding the bolt, which washer has a series of step-like projections, a nut for the bolt having radial teeth formed on its under face, and a locking-plate intended to be located between the washer and the nut, which locking-plate is formed of thin material and is provided with radial slits extending inward from the periphery at suitable points to be bent into engagement with the projection of the washer and the teeth on the under face of the nut substantially as and for the purpose specified.

EUGENE J. SWEENEY.

Witnesses:
NELLIE BUNKER,
L. L. MILLER.